United States Patent
Longuemare et al.

(10) Patent No.: US 10,800,445 B2
(45) Date of Patent: Oct. 13, 2020

(54) VISION BASED ACTIVE STEERING SYSTEM

(71) Applicant: STEERING SOLUTIONS IP HOLDING CORPORATION, Saginaw, MI (US)

(72) Inventors: Pierre C. Longuemare, Paris (FR); Eduardo Audino Novo, Longueil-Sainte-Marie (FR); Thomas Herviou, La Garenne Colombes (FR); Pierre-Etienne Pouchoy, Vaucresson (FR)

(73) Assignee: Steering Solutions IP Holding Corporation, Saginaw, MI (US)

( * ) Notice: Subject to any disclaimer, the term of this patent is extended or adjusted under 35 U.S.C. 154(b) by 209 days.

(21) Appl. No.: 15/902,295

(22) Filed: Feb. 22, 2018

(65) Prior Publication Data

US 2019/0152515 A1    May 23, 2019

(30) Foreign Application Priority Data

Nov. 20, 2017 (EP) .................................... 17202554

(51) Int. Cl.
*B62D 5/04* (2006.01)
*B62D 6/04* (2006.01)
(Continued)

(52) U.S. Cl.
CPC ........... *B62D 5/0463* (2013.01); *B62D 6/007* (2013.01); *B62D 6/008* (2013.01); *B62D 6/04* (2013.01); *B62D 6/08* (2013.01)

(58) Field of Classification Search
CPC ........ B62D 5/0463; B62D 6/007; B62D 6/08; B62D 6/04; B62D 6/008
(Continued)

(56) References Cited

U.S. PATENT DOCUMENTS

| 4,337,967 A | 7/1982 | Yoshida et al. |
| 4,503,504 A | 3/1985 | Suzumura et al. |

(Continued)

FOREIGN PATENT DOCUMENTS

| CN | 103448785 A | 12/2013 | | |
| DE | 10 2010019519 A1 | * 3/2011 | ........... | B62D 5/0472 |

(Continued)

OTHER PUBLICATIONS

Chinese Office Action & Search Report for Chinese Application No. 201610366609.X dated Dec. 20, 2017, including English Translation, 16 pages.

(Continued)

*Primary Examiner* — Brian P Sweeney
(74) *Attorney, Agent, or Firm* — Dickinson Wright PLLC

(57) ABSTRACT

One or more embodiments are described for facilitating a vision based active steering system. An example steering system includes a handwheel actuator that generates a first feedback torque based on road surface forces at a roadwheel. The steering system further includes a controller that receives, from an image-based system, a control signal indicative of a type of road surface based on an image of the road surface. Further, in response, the controller adjusts one or more parameters of the handwheel actuator to generate a second feedback torque based on the road surface forces at the roadwheel.

20 Claims, 5 Drawing Sheets

(51) Int. Cl.
*B62D 6/08* (2006.01)
*B62D 6/00* (2006.01)

(58) Field of Classification Search
USPC .......................................................... 701/41
See application file for complete search history.

(56) References Cited

U.S. PATENT DOCUMENTS

| | | | |
|---|---|---|---|
| 5,319,803 | A | 6/1994 | Allen |
| 6,373,472 | B1 | 4/2002 | Palalau et al. |
| 6,390,505 | B1 | 5/2002 | Wilson |
| 6,819,990 | B2 | 11/2004 | Ichinose |
| 7,062,365 | B1 | 6/2006 | Fei |
| 7,295,904 | B2 | 11/2007 | Kanevsky et al. |
| 7,793,980 | B2 | 9/2010 | Fong |
| 7,894,951 | B2 | 2/2011 | Norris et al. |
| 8,002,075 | B2 | 8/2011 | Markfort |
| 8,079,312 | B2 | 12/2011 | Long |
| 8,260,482 | B1 | 9/2012 | Szybalski et al. |
| 8,352,110 | B1 | 1/2013 | Szybalski et al. |
| 8,548,667 | B2 | 10/2013 | Kaufmann |
| 8,606,455 | B2 | 12/2013 | Boehringer et al. |
| 8,634,980 | B1 | 1/2014 | Urmson et al. |
| 8,670,891 | B1 | 3/2014 | Szybalski et al. |
| 8,818,608 | B2 | 8/2014 | Cullinane et al. |
| 8,825,258 | B2 | 9/2014 | Cullinane et al. |
| 8,825,261 | B1 | 9/2014 | Szybalski et al. |
| 8,843,268 | B2 | 9/2014 | Lathrop et al. |
| 8,874,301 | B1 | 10/2014 | Rao et al. |
| 8,880,287 | B2 | 11/2014 | Lee et al. |
| 8,899,623 | B2 | 12/2014 | Stadler et al. |
| 8,909,428 | B1 | 12/2014 | Lombrozo |
| 8,948,993 | B2 | 2/2015 | Schulman et al. |
| 8,994,521 | B2 | 3/2015 | Gazit |
| 9,002,563 | B2 | 4/2015 | Green et al. |
| 9,073,574 | B2 | 7/2015 | Cuddihy et al. |
| 9,092,093 | B2 | 7/2015 | Jubner et al. |
| 9,134,729 | B1 | 9/2015 | Szybalski et al. |
| 9,150,200 | B2 | 10/2015 | Urhahne |
| 9,150,224 | B2 | 10/2015 | Yopp |
| 9,164,619 | B2 | 10/2015 | Goodlein |
| 9,193,375 | B2 | 11/2015 | Schramm et al. |
| 9,199,553 | B2 | 12/2015 | Cuddihy et al. |
| 9,227,531 | B2 | 1/2016 | Cuddihy et al. |
| 9,233,638 | B2 | 1/2016 | Lisseman et al. |
| 9,235,211 | B2 | 1/2016 | Davidsson et al. |
| 9,235,987 | B2 | 1/2016 | Green et al. |
| 9,238,409 | B2 | 1/2016 | Lathrop et al. |
| 9,248,743 | B2 | 2/2016 | Enthaler et al. |
| 9,290,174 | B1 | 3/2016 | Zagorski |
| 9,290,201 | B1 | 3/2016 | Lombrozo |
| 9,298,184 | B2 | 3/2016 | Bartels et al. |
| 9,308,857 | B2 | 4/2016 | Lisseman et al. |
| 9,333,983 | B2 | 5/2016 | Lathrop et al. |
| 9,352,752 | B2 | 5/2016 | Cullinane et al. |
| 9,360,865 | B2 | 6/2016 | Yopp |
| 2003/0009272 | A1* | 1/2003 | Kato ............... B62D 5/006 701/41 |
| 2007/0241548 | A1 | 10/2007 | Fong |
| 2010/0222976 | A1 | 9/2010 | Haug |
| 2010/0228417 | A1 | 9/2010 | Lee et al. |
| 2010/0288567 | A1 | 11/2010 | Bonne |
| 2012/0136540 | A1 | 5/2012 | Miller |
| 2013/0292955 | A1 | 11/2013 | Higgins et al. |
| 2013/0325202 | A1 | 12/2013 | Howard et al. |
| 2014/0111324 | A1 | 4/2014 | Lisseman et al. |
| 2014/0277896 | A1 | 9/2014 | Fong |
| 2014/0300479 | A1 | 10/2014 | Wolter et al. |
| 2014/0309816 | A1 | 10/2014 | Stefan et al. |
| 2015/0002404 | A1 | 1/2015 | Hooton |
| 2015/0051780 | A1 | 2/2015 | Hahne |
| 2015/0120142 | A1 | 4/2015 | Park et al. |
| 2015/0210273 | A1 | 7/2015 | Kaufmann et al. |
| 2015/0246673 | A1 | 9/2015 | Tseng et al. |
| 2015/0251666 | A1 | 9/2015 | Attard et al. |
| 2015/0283998 | A1 | 10/2015 | Lind et al. |
| 2015/0324111 | A1 | 11/2015 | Jubner et al. |
| 2016/0082867 | A1 | 3/2016 | Sugioka et al. |
| 2016/0185387 | A1 | 6/2016 | Kuoch |
| 2016/0200246 | A1 | 7/2016 | Lisseman et al. |
| 2016/0200343 | A1 | 7/2016 | Lisseman et al. |
| 2016/0200344 | A1 | 7/2016 | Sugioka et al. |
| 2016/0207538 | A1 | 7/2016 | Urano et al. |
| 2016/0209841 | A1 | 7/2016 | Yamaoka et al. |
| 2016/0229450 | A1 | 8/2016 | Basting et al. |
| 2016/0231743 | A1 | 8/2016 | Bendewald et al. |
| 2016/0347348 | A1 | 12/2016 | Lubischer et al. |

FOREIGN PATENT DOCUMENTS

| | | |
|---|---|---|
| DE | 102010019519 A1 | 3/2011 |
| DE | 102013216244 A1 | 2/2015 |
| DE | 102016207435 A1 | 11/2017 |
| EP | 1273501 A2 | 1/2003 |
| JP | S60157963 A | 8/1985 |
| JP | 2007253809 A | 10/2007 |

OTHER PUBLICATIONS

European Search Report for EP 17202554.6-1013 dated Jun. 14, 2018; 8 pages.

\* cited by examiner

VISION BASED ACTIVE STEERING SYSTEM

PRIORITY

This application claims priority to European Patent Application No. 17202554.6, filed Nov. 20, 2017, and all the benefits accruing therefrom, the contents of which in its entirety are herein incorporated.

BACKGROUND

This application generally relates to an electric power steering (EPS) system in a vehicle, and particularly a vision based system to adjust operation of a steering system.

In recent years, there have been proposed and developed various electric power steering (EPS) systems. In the EPS systems, a rotation angle of an input shaft which rotates by driver's steering operation of a steering wheel and a rotation angle of an output shaft to which the rotation of the input shaft is transmitted are detected by a detector such as a torque sensor, and on the basis of this detection signal of the torque sensor, torque is transmitted to the steering mechanism of the vehicle from the electric motor. In this manner, the EPS system performs the steering assist.

In steer-by-wire type EPS systems, mechanical devices with linkages and mechanical connections are replaced with sensors, actuators, and electronics. For example, in a conventional steering system, which includes a steering wheel, a steering column, a power assisted rack and pinion system, and tie rods, the driver turns the steering wheel which, through the various mechanical components, causes the road wheels of the vehicle to turn. In the steer-by-wire system, a number of the mechanical components between the steering wheel and the road wheels of the vehicle are replaced with a sensor at the steering wheel and both sensors and actuators at the road wheels, and the rotation of the steering wheel is measured by the sensor. This rotation measurement is processed by the electronics to generate command signals for the actuators to turn the road wheels. Driver feedback in the form of steering torque that is designed to represent the feel of the road is provided by torque and rotation servo-actuators with software that provide simulation of driving conditions for the driver.

Creating perception of the road surface to the driver is a challenge with EPS systems and particularly with the steer-by-wire EPS systems. Current systems use signal processing on steering system embedded sensors, in conjunction with vehicle dynamics information, to adjust frequency and amplitude of the assist/feedback torque and amplify/recreate steering feel specific to the road surface. Such algorithms are effective but provide some limitations, such as in discriminating accurately the road surfaces and further in terms of response time. Further, for the current sensor-based surface detection to operate steering motion may be required. Accordingly, an improved surface detection for the steering system is desired.

SUMMARY

One or more embodiments are described for facilitating a vision based active steering system. An example steering system includes a handwheel actuator that generates a first feedback torque based on road surface forces at a roadwheel. The steering system further includes a controller that receives, from an image-based system, a control signal indicative of a type of road surface based on an image of the road surface. Further, in response, the controller adjusts one or more parameters of the handwheel actuator to generate a second feedback torque based on the road surface forces at the roadwheel.

According to one or more embodiments, a method for adjusting a response of a steering system, includes generating, by a handwheel actuator, a first feedback torque based on road surface forces at a roadwheel. The method further includes receiving, from an image-based system, a control signal indicative of a type of road surface based on an image of the road surface. The method further includes adjusting, by a controller, one or more parameters of the handwheel actuator to generate a second feedback torque based on the road surface forces at the roadwheel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

DETAILED DESCRIPTION

Figure 1:
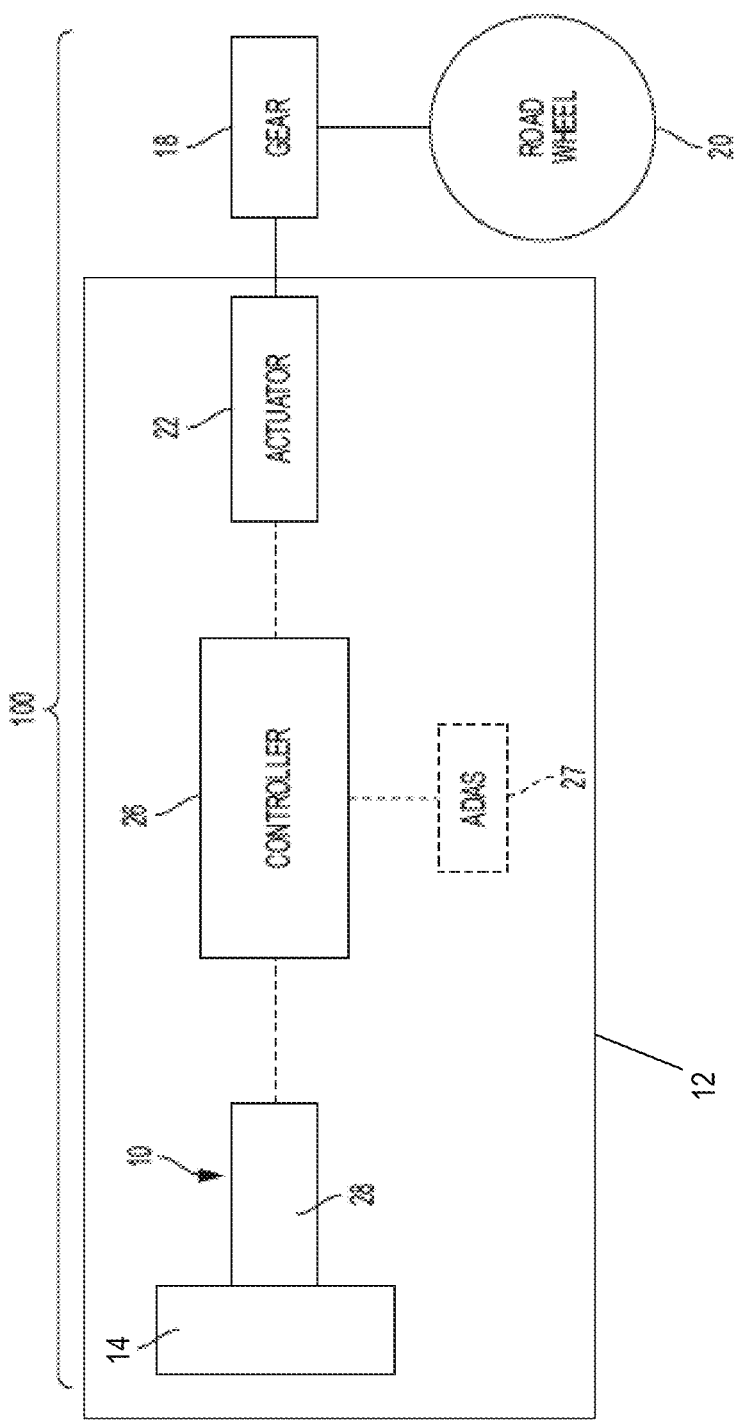
FIG. 1 schematically illustrates an embodiment of a steer-by-wire vehicle having a torque feedback system.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The following description is merely exemplary in nature and is not intended to limit the present disclosure, application, or uses. It should be understood that throughout the drawings, corresponding reference numerals indicate like or corresponding parts and features.

Referring now to the Figures, where the invention will be described with reference to specific embodiments, without limiting same, a steering system 12 in a vehicle 100 is depicted in FIG. 1. The steering system 12 includes a torque feedback system 10 for a steering wheel 14 (or handwheel) in the vehicle 100 that is alternatively a conventional vehicle 100 that is a steer-by-wire vehicle 100, or as further described herein, an autonomous or semi-autonomous vehicle 100 having a steer-by-wire system. It will be appreciated that the steer-by-wire steering system 12 shown and described can be used in an autonomous or semi-autonomous vehicle or in a more conventional vehicle. The torque feedback system 10 provides a cost-effective torque feedback system for steer-by-wire vehicle 100, which includes a controller 26. Although not required, the controller 26 may also be associated with an autonomous or semi-autonomous vehicle utilizing an advanced driver assistance system ("ADAS") 27, thus converting a conventional steer-by-wire vehicle into an autonomous or semi-autonomous vehicle. The ADAS system 27 may utilize a navigation system that enables the vehicle 100 and its passengers to drive portal-to-portal without ever having the operator steer the vehicle 100. When the ADAS system 27 is activated, the steering wheel 14 is not required for control of the vehicle 100, and therefore, rotation of the steering wheel 14 is not required during the autonomous driving mode.

The steer-by-wire vehicle 100 does not include a mechanical connection between the steering wheel 14 and a steering gear 18, such as electric power steering gear, which is operatively coupled to a plurality of road wheels 20. However, the steering wheel 14 and steering gear 18 are electrically coupled. Guidance of the vehicle 100 is performed by use of the steering gear 18, with an input shaft that is rotated by an actuator 22, such as a servo actuator. In an embodiment that includes the ADAS system 27, in a non-active mode of the ADAS system 27, the actuator 22 receives an electronic communication signal of rotation of the steering wheel 14 by the driver. It should be noted that although the example herein describes a steering wheel 14, the technical solutions described herein are applicable in other examples that use different driver input devices and/or methods used for maneuvering a vehicle.

The ADAS system 27 is configured to be activated when an autonomous vehicle driving condition is desired, thereby deactivating directional control of the road wheels 20 by the steering wheel 14. The driver is able to switch between the autonomous vehicle driving condition and a non-autonomous vehicle driving condition.

The non-autonomous vehicle driving condition (non-active mode of ADAS system 27, if ADAS system 27 is included) includes a driver controlling the steering wheel 14 to directionally control the vehicle 100. As noted above, in a non-active mode of the ADAS system 27, the actuator 22 receives an electronic communication signal of rotation of the steering wheel 14 by the driver. However, due to the lack of mechanical connection between the steering wheel 14 and the road wheels 20, the driver is not provided with a feel for the road without torque feedback. In one or more examples, the torque system 10 may include a servo actuator coupled to the steering column 28 and steering wheel 14 to simulate the driver's feel of the road. The torque system 10 may apply tactile feedback in the form of torque to the steering wheel 14 and are coupled to the steering wheel 14 and/or the steering column 28. It should be noted that in one or more examples, the torque feedback system 10 may provide the tactile feedback using any other components in lieu of another servo actuator coupled to the steering column 28 and steering wheel 14 to provide tactile feedback in the form of torque to the steering wheel 14 to simulate the driver's feel of the road.

Aspects of embodiments described herein may be performed by any suitable control system and/or processing device, such as the control module 26. In one embodiment, the control module 26 is or is included as part of an autonomous driving system.

A processing or control device, such as the control module 26, address technical challenges described herein by implementing the technical solutions described herein. For example, a technical challenge in a steering system 12 is creating perception of the road surface to the driver in a steer-by-wire systems. Current systems using signal processing on signals from one or more embedded sensors, in conjunction with vehicle dynamics information, to adjust frequency and amplitude of the assist/feedback torque and amplify/re-create steering feel specific to the road surface. However, the current systems have limitations, for example, in terms of discriminating accurately the road surfaces, and in terms of response time. Further, in current systems, a steering motion may be required for the surface detection to operate.

The technical solutions described herein address the technical challenges described above. According to one or more embodiments the technical solutions described herein facilitate a steering system to use context information from a road monitoring camera to alter the steering feel. For example, the technical solutions facilitate using image-based road surface detection to adjust one or more parameters of the steering system to change the feel of the steering system. For example, in case of an EPS system, which is not a steer-by-wire system, the parameters that are adjusted include an assist level, an assist frequency response, and a tire behavior model used in closed loop control system to predict lateral response earlier, before roadwheel motion occurs. Further, in the case of steer by wire systems, the adjusted parameters may include a torque feedback level on HWA, a torque feedback frequency content on HWA, the tire behavior model used in closed loop control system to predict lateral response earlier, before roadwheel motion occurs, and a steering ratio between HWA and RWA. It should be noted that other parameters may be adjusted other than the examples listed above.

Figure 2:
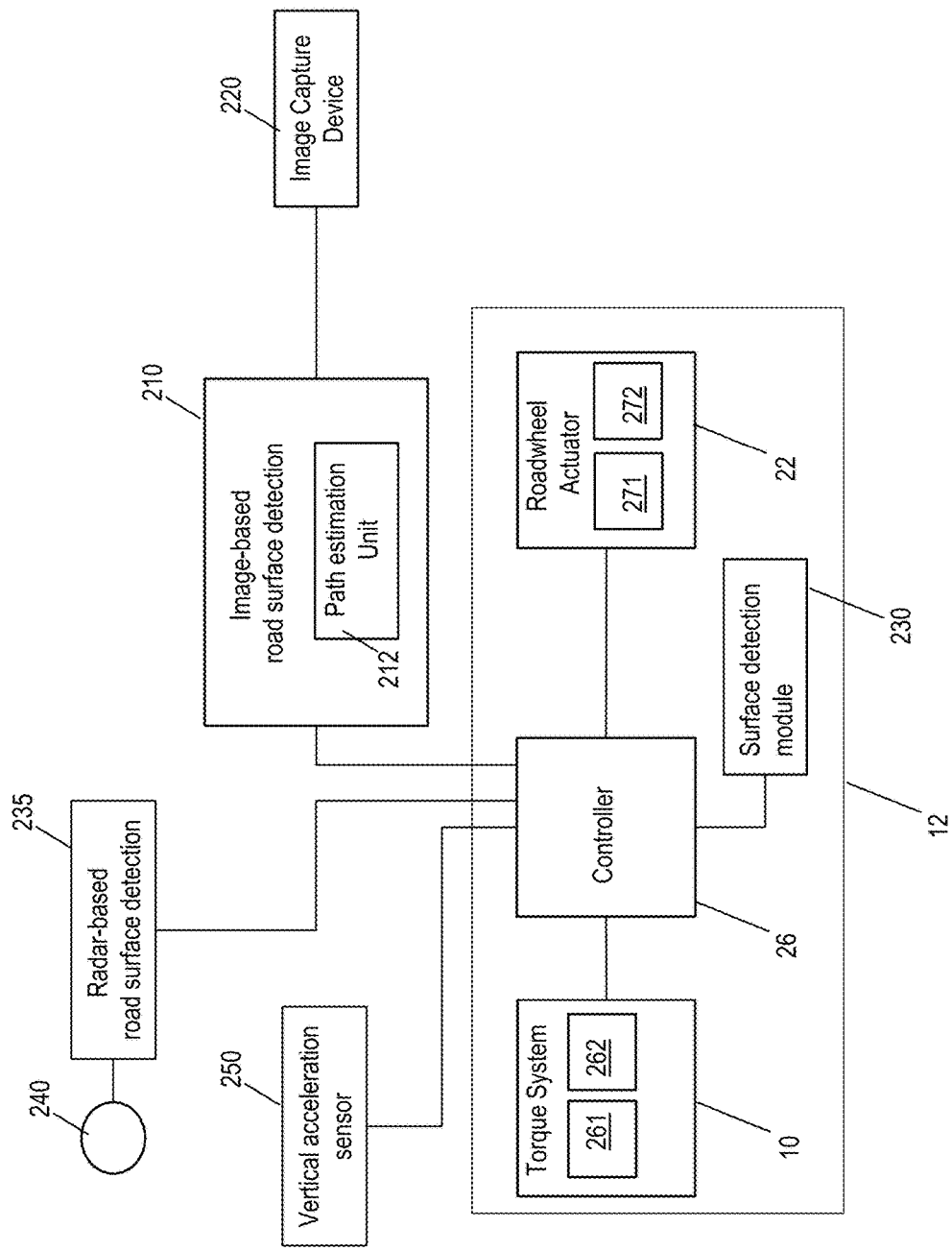
FIG. 2 depicts a block diagram of a system for adjusting a steering system parameters according to image-based road surface detection according to one or more embodiments.

FIG. 2 depicts a block diagram of a system for adjusting a steering system parameters according to image-based road surface detection according to one or more embodiments. FIG. 2 depicts a partial block diagram for the steering system 12 that includes the control module 26, the torque system 10, and an actuator 27. As described herein, the torque system 10 includes a module 261 that generates torque for creating a steering feel for the driver. Further, the torque system 10 includes a steering ratio module 262 that configures the steering ratio of the steering system 12. Steering ratio 262 refers to the ratio between the turn of the steering wheel 14 (in degrees) (or maneuvering of any other driver input device) and the turn of the roadwheels 20 (in degrees) in response. The steering ratio is the ratio of the number of degrees of turn of the steering wheel 14 to the number of degrees the road wheel(s) 20 turn as a result. For example, the steering ratio is variable, where the variable-ratio steering facilitates the extreme left and extreme right limits of steering to not correspond with the extreme left and extreme right limits of the road wheels 20, and instead, based on one or more conditions, vary the steering ratio. It should be noted that steering ratio above is an example, and that in other examples, the steering ratio indicates an amount of change in a roadwheel position corresponding to a driver input to the steering system 12.

Further, the roadwheel actuator 27 generates assist torque for applying to the roadwheel 20 in response to and to boost the handwheel torque applied by the driver via the steering wheel 14. In one or more examples, the roadwheel actuator 27 includes a roadwheel angle generation module 271 that receives the steering ratio as configured by the steering ratio module 262. The roadwheel angle generation module 271 further receives a target roadwheel position based on the handwheel torque, and according to the steering ratio, determines and generates the motor command to move the actuator motor. The roadwheel actuator 27 further includes a response module 272 that executes a chasis/roadwheel/chasis response model to compute a road surface friction to be used by the control module 26 to generate the feedback to the driver.

The control module 26 is coupled with an image-based road surface detection module 210, which in turn is coupled with an image capture device 220. In one or more examples, the road surface detection module 210 sends one or more control signals to the control module 26, for example indicating a type of road surface detected for the present driving conditions. In response the control module 26 adjusts the operation parameters of the steering system 12, to adjust the assist torque as well as the torque to generate the steering feel for the driver.

Figure 3:
FIG. 3 depicts example road surfaces detected by the image-based road surface detection module according to one or more embodiments.

FIG. 3 depicts example road surfaces detected by the image-based road surface detection module according to one or more embodiments. The road surface detection module 210 receives images captured by the image capture device 220, such as a camera. The image capture device 220 is installed on the vehicle 10, such as in a dash of the vehicle 10, on the windshield, on the wheel assembly, on the underside of the vehicle 10, or any other location on the vehicle 10. The image capture device 220 may be a stereo sensor unit that generates image data, for example, a stereo camera configured to generate a left and a right image. In one or more examples, the stereo sensor unit may include two mono cameras mounted in horizontally differing positions on the vehicle 10. The image capture device 220 generates image data which images an area in a driving direction of the vehicle 10.

In one or more examples, the image data is provided to the road surface detection module 210, which extracts a relevant image portion from the image data. The relevant image portion is determined by the road surface detection module 210 based on future vehicle path data. For example, the future vehicle path data is provided by a vehicle path estimation unit 212, which generates the future vehicle path data as information over which areas shown in the image data the vehicle 10, and in particular the wheels thereof will pass with a certain probability in a predetermined time extending into the future.

The road surface detection module 210 may be a computing unit, such as a processor, microprocessor, or the like that analyzes the image data to determine the road surface on which the vehicle 10 is being driven. In one or more examples, the road surface detection module 210 compares the captured image data with predetermined image data for different types of road surfaces, and based on a matching score for the different predetermined image data, determines the road surface on which the vehicle 10 is being driven. For example, the road surface detection module 210 may use one or more image recognition or pattern recognition algorithms, such as contour based image recognition, speeded up robust features (SURF), Hough transform, scale-invariant feature transform (SIFT), neural network or any other machine learning algorithms, and any other feature detection algorithm and a combination thereof. Further, the road surface detection module 210 may use machine learning to further facilitate detecting the road surface using the captured image data.

Thus, based on the captured image data and the predetermined image, the road surface detection module 210 determines the road surface that the vehicle 10 is being driven on. For example, as shown in FIG. 3, the road surface may be a dry asphalt road surface 310, a light gravel road surface 320, a transitioning from one surface to another 330, a strong gravel road surface 340, a sand road surface 350, a split surface 360, or the like.

In one or more examples, to improve the safety, integrity and precision of the road surface assessment, the road surface detection module 210 fuses the image data from the image capture device 220 with additional sensor data. For example, the steering system may include an internal surface estimation system 230. The internal surface estimation system 230 may estimate the road surface based on sensor signals, such as vehicle speed, rate of change of steering wheel position, roadwheel torque, and so on. The internal surface detection system 230 may generate another surface detection estimate, which is received by the controller 26, which fuses the estimate for the road surface from the image-based road surface detection module 210 with the second surface detection estimate from the internal surface detection system 230 of the steering system 12.

Further, the controller 26 may receive information from a radar 240, such as background noise signal on the radar 240. The background noise may be used to determine another estimate of the road surface type. Alternatively, a radar-based road surface detection module 235 receives the captured data from the radar 240, and determines the third estimate of the road surface, which is then forwarded to the controller 26. The controller fuses the three road surface estimates, a first based on the image data, a second based on the steering system control signals, and a third based on the radar data, to determine a road surface type for the vehicle 10.

Further yet, the controller 26 may also fuse the road surface estimates from various sources with other sensor signals, such as with a vertical acceleration information, for example from a gyroscope or any other vertical position sensor 250. Such sensor information may be used to verify and/or validate the road surface detection from other sources. Alternatively, or in addition, the signals from the vertical position sensor 250 is used with information from the other devices, such as the image capture device 220, the radar 240, and the internal surface detection module 230, to determine a road surface using sensor fusion. Sensor fusion is combining of sensory data or data derived from disparate sources such that the resulting information has less uncertainty than when the sources are used individually. Thus, by using road surface detection from multiple sources, the controller 26 increases the accuracy of the detected road surface.

Figure 4:
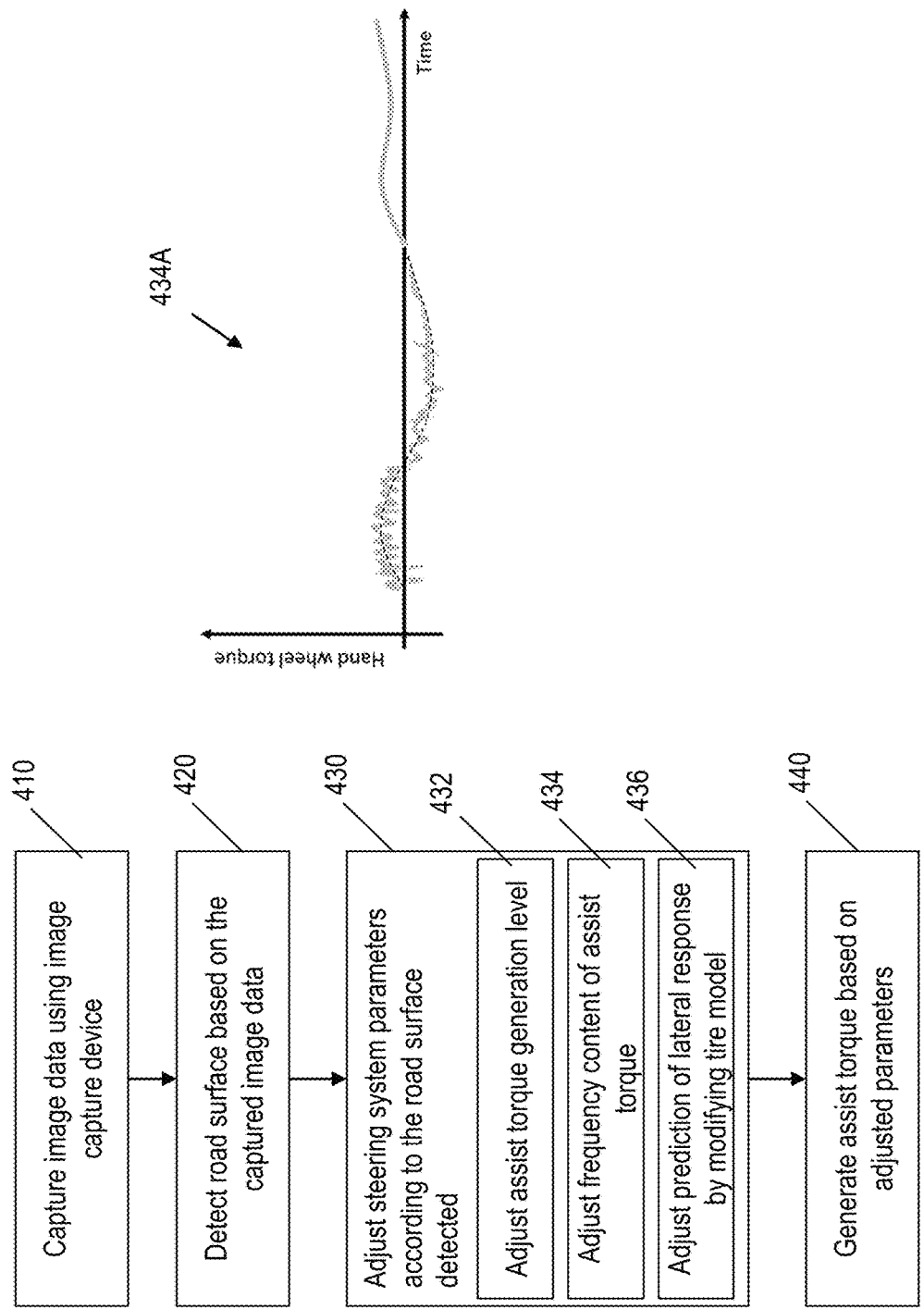
FIG. 4 illustrates a flowchart of an example method for adjusting steering system based on captured image data according to one or more embodiments.

FIG. 4 illustrates a flowchart of an example method for adjusting steering system based on captured image data according to one or more embodiments. In one or more examples, the method depicted is implemented in an EPS system 12. In one or more examples, the method is implemented in a steering system 12 that is not a steer-by-wire system. In addition, the method is implemented in a steer-by-wire steering system. The method includes capturing image data using the image capture device 220, as shown at 410. In one or more examples, the control module 26 instructs the road surface detection module 210 and/or the image capture device 220 to capture the image data. For example, the instruction may be sent at a predetermined frequency, such as every 5 seconds, every 30 seconds, every 50 microseconds, or any other such predetermined frequency.

The method further includes detecting the road surface using the captured image data, as shown at 420. In one or more examples, the road surface detection module 210 determines the type of the road surface and sends a notification of the detected type to the control module 26. As described herein, determining the road surface may include using sensor fusion and/or determining the road surface based on road surfaces detected by multiple sources, such as a first based on image data, a second based on radar-data, a third based on steering system internal control signals, and so on. Further, in one or more examples, the detected road surface may be validated using one or more sensor data, such as from a vertical position sensor 250.

The control module 26, in response, adjusts the steering system parameters for generating the assist torque according to the road surface detected, as shown at 430. For example, the control module 26 adjusts the parameters of the actuator 22 that generates the assist torque based on the handwheel torque applied by the driver. For example, the control module 26 adjusts an assist torque generation level of the actuator 22, as shown at 432. The assist torque generation level may be a scaling factor that determines an amount of assist torque to generate in response to the amount of handwheel torque applied by the driver to maneuver the steering wheel 14. The actuator 22 may cause a motor (not shown) to generate the assist torque by generating voltage and/or current commands for the motor corresponding to the amount of assist torque to be generated.

Further, in one or more examples, the control module 26 adjusts a frequency content of the assist torque generated by the actuator 22, as shown at 434. The frequency content of the assist torque determines an amount of assist torque to generate in response to the amount of handwheel torque applied by the driver to maneuver the steering wheel 14. For example, in FIG. 4, an example plot 434A depicts an assist torque generated in response to an input handwheel torque using a dotted line, with a superimposed modification being introduced to add frequency content to the assist torque being generated. Further yet, in one or more examples, the control module 26 adjusts a tire model (such as Bicycle model) that the control module 26 may use to predict lateral response earlier, before roadwheel motion occurs, as shown at 436. By adjusting the tire model, the control module 26 may determine the predicted lateral response differently according to the road surface detected. For example, for a sand surface, the control module 26 adjusts the tire model so that a quicker lateral response is predicted compared to a dry asphalt surface.

The method further includes generating the assist torque based on the adjusted parameters, as shown at 440. The assist torque in conjunction with the handwheel torque causes the roadwheel 20 to move according to the maneuvers by the driver. It should be noted that in one or more examples, instead of the driver the maneuvers are made by the ADAS 27. If the ADAS 27 is operating the vehicle 10, the torque system 10 may not generate torque that causes the steering feel for the driver.

Figure 5:
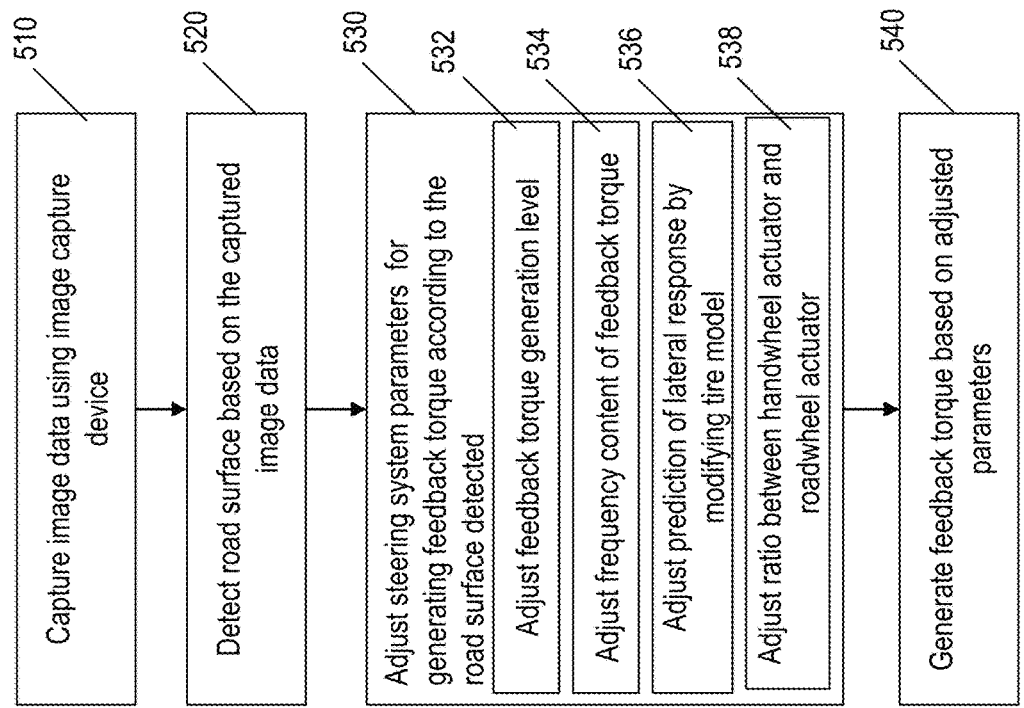
FIG. 5 depicts a flowchart of an example method for adjusting steering system to generate feedback torque based on captured image data according to one or more embodiments.

FIG. 5 depicts a flowchart of an example method for adjusting steering system to generate feedback torque based on captured image data according to one or more embodiments. In one or more examples, the method is implemented in a steer-by-wire steering system. The feedback torque is generated by the torque system 10 and causes the steering feeling for the driver. The method includes capturing image data using the image capture device 220, as shown at 510. In one or more examples, the control module 26 instructs the road surface detection module 210 and/or the image capture device 220 to capture the image data. For example, the instruction may be sent at a predetermined frequency, such as every 5 seconds, every 30 seconds, every 50 microseconds, or any other such predetermined frequency.

The method further includes detecting the road surface using the captured image data, as shown at 520. In one or more examples, the road surface detection module 210 determines the type of the road surface and sends a notification of the detected type to the control module 26. As described herein, determining the road surface may include using sensor fusion and/or determining the road surface based on road surfaces detected by multiple sources, such as a first based on image data, a second based on radar-data, a third based on steering system internal control signals, and so on. Further, in one or more examples, the detected road surface may be validated using one or more sensor data, such as from a vertical position sensor 250.

The control module 26, in response, adjusts the steering system parameters for generating the feedback torque according to the road surface detected, as shown at 530. For example, the control module 26 adjusts the parameters of the torque system 10 that generates the feedback torque based on the road conditions to provide the driver the steering feeling. For example, the control module 26 adjusts a feedback torque generation level of the torque system 10, as shown at 532. In one or more examples, the torque system 10 includes a handwheel actuator that causes the generation of the feedback torque using a motor (not shown). The feedback torque generation level may be a scaling factor that determines an amount of feedback torque to generate in response to the amount of surface torque detected by the roadwheel 20, and or the wheel assembly that the roadwheel 20 is a part of. The torque system 10 may cause a motor (not shown) to generate the feedback torque by generating voltage and/or current commands for the motor corresponding to the amount of feedback torque to be generated. The motor used for generating the feedback torque may be different than the motor used for generating the assist torque. Alternatively, the same motor may be used to generate the feedback torque and the assist torque.

Further, in one or more examples, the control module 26 adjusts a frequency content of feedback torque generated by the torque system 10, as shown at 534. The frequency content of the feedback torque determines an amount of feedback torque to generate in response to the amount of surface torque experienced by the roadwheel 20. Further yet, in one or more examples, the control module 26 adjusts the tire model (such as Bicycle model) that the control module 26 may use to predict lateral response earlier, before roadwheel motion occurs, as shown at 536. By adjusting the tire model, the control module 26 may determine the predicted lateral response differently according to the road surface detected. For example, for a sand surface, the control module 26 adjusts the tire model so that a quicker lateral response is predicted compared to a dry asphalt surface.

Further yet, in one or more examples, the control module 26 adjusts ratio between handwheel actuator in the torque system 10 and roadwheel actuator 22, as shown at 538. The ratio determines how much the roadwheel 20 move in response to a corresponding motion in the steering wheel 14. Because there is no mechanical linkage between the steering wheel 14 and the roadwheel 20 in a steer-by-wire system, such a variable steering ratio, which improves the drivability of the vehicle, determines the change in position of the roadwheel 20 in response to change in position of the steering wheel 14.

For example, when variable-ratio steering is implemented, the extreme left and extreme right limits of steering do not consistently correspond with the extreme left and extreme right limits of the road wheels 20. For example, if the hand to road wheel steering ratio is decreased for traveling at low speeds, e.g., in a parking lot situation, the driver need not rotate the hand wheel as far as he or she would if variable ratio steering was not implemented. In this case, the roadwheels 20 reach the limit of their steering capability before the steering wheel 14 does since the positive travel end stop is fixed to correspond with the highest steering wheel to road wheel turning ratio. Further, on different types of road surfaces the steering ratio is adjusted to improve drivability so that the driver can maneuver the vehicle 10 with minimum effort on different kinds of surfaces. In one or more examples, the ratio is picked from a look-up-table using the type of the road surface detected.

The method further includes generating the feedback torque based on the adjusted parameters, as shown at 540. The feedback torque causes the steering wheel 14 to vibrate, jerk, buzz, and move to cause the driver to feel the condition/type of the road surface in a steer-by-wire system without mechanical linkages between the roadwheel 20 and the steering wheel 14.

The technical solutions described herein facilitate usage of road surface recognition from a vision system to adjust a response of a steering system. For example, the technical solutions facilitate adjusting the response by adjusting a ratio of the road wheel actuation system, or example with respect to a steering wheel (or handwheel) actuation system. Further, adjusting the response may include adjusting a level of torque and/or frequency response in the handwheel actuation system. Further, the adjusting may include adjusting a level of torque and/or frequency response in the roadwheel actuation system. Alternatively, or in addition, the adjusting includes adjusting parameters applied in the chassis response using a tire model used by the steering control system. The technical solutions described herein further facilitate fusion of vision-based surface estimation with additional sources of sensory data and road surface detection, such as with a radar-based system, a 3-axis acceleration data system, and/or steering system sensors. Such fusion of sensory data improves safety, integrity, and accuracy of the surface estimation.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system comprising:
a handwheel actuator that generates a first feedback torque based on road surface forces at a roadwheel; and
a controller configured to:
receive, from an image-based system, a control signal indicative of a type of road surface based on an image of the road surface; and
in response, adjust one or more parameters of the handwheel actuator to generate a second feedback torque based on the road surface forces at the roadwheel, wherein the one or more parameters of the handwheel actuator comprise a frequency content of torque feedback, wherein the frequency content determines a frequency of vibrations caused at a steering wheel of the steering system.

2. The steering system of claim 1, wherein the one or more parameters of the handwheel actuator comprise a torque feedback level, wherein the torque feedback level determines an intensity of the feedback torque at a steering wheel of the steering system.

3. The steering system of claim 1, wherein the one or more parameters of the handwheel actuator comprise a steering ratio of the steering system, wherein the steering ratio indicates an amount of change in a roadwheel position corresponding to a driver input to the steering system.

4. The steering system of claim 1, further comprising:
a roadwheel actuator that generates a first assist torque based on handwheel torque applied at a steering wheel; and
wherein, the controller is further configured to:
adjust one or more parameters of the roadwheel actuator to generate a second assist torque based on the handwheel torque applied at the steering wheel.

5. The steering system of claim 4, wherein the one or more parameters of the roadwheel actuator comprise an assist torque level, wherein the assist torque level determines an intensity of the assist torque.

6. The steering system of claim 4, wherein the one or more parameters of the roadwheel actuator comprise a frequency content of assist torque.

7. The steering system of claim 1, wherein the type of road surface based on the image of the road surface is a first type of road surface, and wherein the controller is further configured to:
receive a second type of road surface from a second road surface detection system;
determine a final type of road surface from the first type of road surface and the second type of road surface using sensor fusion; and
adjust the one or more parameters of the handwheel actuator based on the final type of road surface.

8. The system of claim 7, wherein the controller is further configured to adjust the one or more parameters of a roadwheel actuator based on the final type of road surface.

9. The system of claim 7, wherein the second road surface detection system uses captured radar data to determine the second type of road surface.

10. The system of claim 7, wherein the second road surface detection system uses internal control signals of the steering system to determine the second type of road surface.

11. A method for adjusting a response of a steering system, the method comprising:
generating, by a handwheel actuator, a first feedback torque based on road surface forces at a roadwheel;
receiving, from an image-based system, a control signal indicative of a type of road surface based on an image of the road surface;
adjusting, by a controller, one or more parameters of the handwheel actuator to generate a second feedback torque based on the road surface forces at the roadwheel; and
adjusting, by the controller, based on the type of road surface that is based on the image of the road surface, a steering ration of the steering system.

12. The method of claim 11, wherein the one or more parameters of the handwheel actuator comprise a feedback torque level, and a frequency content of feedback torque, that determine an intensity of the generated feedback torque at a steering wheel of the steering system.

13. The method of claim 11, further comprising adjusting, by the controller, one or more parameters of a plant model used by the steering system to predict lateral response of the roadwheel to torque applied at a steering wheel.

14. The method of claim 11, further comprising:
generating, by a roadwheel actuator, a first assist torque based on handwheel torque applied at a steering wheel; and
adjusting, by the controller, in response to the type of road surface, one or more parameters of the roadwheel actuator to generate a second assist torque based on the handwheel torque applied at the steering wheel.

15. The method of claim 14, wherein the one or more parameters of the roadwheel actuator comprise an assist torque level and a frequency content of assist torque.

16. The method of claim 11, wherein the type of road surface based on the image of the road surface is a first type of road surface, and wherein the method further comprises:
receiving, by the controller, a second type of road surface from a second road surface detection system;
determining, by the controller, a final type of road surface from the first type of road surface and the second type of road surface using sensor fusion; and
adjusting, by the controller, the one or more parameters of the handwheel actuator based on the final type of road surface.

17. The method of claim 16, wherein the second road surface detection system uses one of a captured radar data to determine the second type of road surface, or internal control signals of the steering system to determine the second type of road surface.

18. A steering system comprising:
a handwheel actuator that generates a first feedback torque based on road surface forces at a roadwheel; and
a controller configured to:
receive, from an image-based system, a control signal indicative of a type of road surface based on an image of the road surface; and
in response, adjust one or more parameters of the handwheel actuator to generate a second feedback torque based on the road surface forces at the roadwheel, wherein the one or more parameters of the handwheel actuator comprise parameters of a plant model used by the steering system to predict lateral response.

19. The steering system of claim 18, further comprising:
a roadwheel actuator that generates a first assist torque based on handwheel torque applied at a steering wheel; and
wherein, the controller is further configured to:
adjust one or more parameters of the roadwheel actuator to generate a second assist torque based on the handwheel torque applied at the steering wheel.

20. The steering system of claim 19, wherein the one or more parameters of the roadwheel actuator comprise an assist torque level, wherein the assist torque level determines an intensity of the assist torque.

* * * * *